(12) United States Patent
Ting et al.

(10) Patent No.: US 9,500,175 B2
(45) Date of Patent: Nov. 22, 2016

(54) MOTORCYCLE ENGINE CONTROL SYSTEM AND METHOD FOR ENABLING THE USE OF TRADITIONAL CRANKSHAFT

(71) Applicants: Wai Cheung Ting, Hong Kong (HK); Chun Wang, Hong Kong (HK); Shi Jun Lei, Hong Kong (HK); TianDe Mo, Hong Kong (HK)

(72) Inventors: Wai Cheung Ting, Hong Kong (HK); Chun Wang, Hong Kong (HK); Shi Jun Lei, Hong Kong (HK); TianDe Mo, Hong Kong (HK)

(73) Assignee: Startec Ltd., Hong Kong (HK)

( * ) Notice: Subject to any disclaimer, the term of this patent is extended or adjusted under 35 U.S.C. 154(b) by 231 days.

(21) Appl. No.: 14/307,514

(22) Filed: Jun. 18, 2014

(65) Prior Publication Data

US 2015/0369204 A1    Dec. 24, 2015

(51) Int. Cl.
| | |
|---|---|
| F02D 41/00 | (2006.01) |
| F02P 17/12 | (2006.01) |
| F02P 7/067 | (2006.01) |
| F02P 5/15 | (2006.01) |
| F02D 35/02 | (2006.01) |

(52) U.S. Cl.
CPC ............ *F02P 17/12* (2013.01); *F02D 41/009* (2013.01); *F02P 5/1502* (2013.01); *F02P 7/067* (2013.01); *F02D 35/028* (2013.01); *F02D 2200/0406* (2013.01); *F02P 5/1506* (2013.01)

(58) Field of Classification Search
CPC .................... F02D 41/009; F02D 2200/0406; F02P 7/067
USPC ..................... 73/114.27, 114.33; 123/406.58
See application file for complete search history.

(56) References Cited

U.S. PATENT DOCUMENTS

| | | | |
|---|---|---|---|
| 4,424,568 A | 1/1984 | Nishimura et al. | |
| 4,889,094 A * | 12/1989 | Beyer ................... | F02D 41/009 123/643 |
| 4,893,244 A | 1/1990 | Tang et al. | |
| 5,321,979 A * | 6/1994 | Mc Kendry ............ | G01L 23/30 73/114.27 |
| 6,170,322 B1 * | 1/2001 | Yamazaki ............. | F02D 41/009 73/114.27 |
| 6,588,259 B2 * | 7/2003 | Lodise .................. | F02D 41/009 73/114.27 |
| 6,598,469 B2 * | 7/2003 | Shimoyama .......... | F02D 41/045 73/114.24 |
| 6,804,997 B1 | 10/2004 | Schwulst | |
| 6,955,081 B2 | 10/2005 | Schwulst | |
| 7,302,835 B2 * | 12/2007 | Galtier ...................... | F01L 1/34 73/114.27 |
| 7,878,048 B2 * | 2/2011 | Wang .................... | F02D 35/023 73/114.27 |
| 7,997,245 B2 * | 8/2011 | Tokugawa ............ | F02D 41/009 123/179.18 |
| 2002/0170346 A1 * | 11/2002 | Shimoyama .......... | F02D 41/009 73/114.28 |
| 2006/0116813 A1 * | 6/2006 | Tsuyuguchi .......... | F02D 41/009 701/114 |

\* cited by examiner

*Primary Examiner* — Erick Solis
(74) *Attorney, Agent, or Firm* — Ella Cheong Hong Kong; Sam T. Yip

(57) ABSTRACT

An engine ignition control method and system for controlling ignition timing that computes a predicted crankshaft angular velocity based on prior computed and verified crankshaft angular velocity and acceleration and determines a capture window of the next crankshaft position sensor pickup signal for the verification of the predicted crankshaft angular velocity. The ignition control system also utilizes both crankshaft position pickup signals and the intake manifold air pressure measurements for determining the stroke of the combustion cycle in turn providing more accurately timed signals for the fuel injection and ignition systems. During engine starts, the engine ignition control system performs a series of continuous spark-triggering, determines if each spark-triggering being at the correct or incorrect point in the combustion cycle by detecting if there is any engine acceleration and adjusts the generation of the signal for the next spark-triggering accordingly.

2 Claims, 2 Drawing Sheets

MOTORCYCLE ENGINE CONTROL SYSTEM AND METHOD FOR ENABLING THE USE OF TRADITIONAL CRANKSHAFT

COPYRIGHT NOTICE

A portion of the disclosure of this patent document contains material, which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The presently claimed invention relates generally to internal combustion engines and more specifically relates to small size internal combustion engines used in motorcycles, scooters, lawnmowers, pumps, and industrial and farm machineries.

BACKGROUND

Due to the increasingly strict gaseous pollutant emission regulations in many countries, and users' demands on performance and fuel consumption efficiency of motorcycles, the use of fuel injection technology in motorcycle engines is an important and emerging trend. However, the adoption of fuel injection technology inevitably increases the manufacturing cost of the engine and in turn the price of motorcycles. Furthermore, it is impossible to rapidly replace all old motorcycles in existing use with newer and cleaner ones in some countries. As such, there is a need to retrofit or modify traditional motorcycle engines that are still using the carburetor technology with the cleaner fuel injection technology. To be economically and logistically feasible, however, the retrofitting or modification must be simple and low cost.

There exist methods to replace a carburetor with a fuel injector with relative ease. However, the higher fuel injection and ignition timing requirements of a fuel injector-based engine must be met. One type of fuel injection-based engine uses crankshaft and camshaft dual position sensors to generate pickup signals, which can indicate crank angle, crankshaft rotational speed, piston and valve positions, and the stroke of combustion cycle, for an engine control unit (ECU) to precisely time the fuel injection and ignition systems. Another type of fuel injection engine uses a crankshaft having multiple rotational position marker teeth or notches (multi-tooth crankshaft) for a crankshaft position sensor to generate multiple pickup signals per rotation for the ECU. On the other hand, because of the relatively simpler mechanical design, a traditional carburetor-based engine has a single notch crankshaft for providing the timed triggers for ignition sparks. As such, its crankshaft position sensor can generate only one pickup signal per rotation, and by itself insufficient to accurately time the fuel injection and ignition systems. One solution is to install additional sensors but this increases the cost and further complicates the retrofitting. Substantially modifying the crankshaft or other parts of an old used engine is also not economically sound. Therefore, there is a need for a simple and low cost approach to retrofit carburetor-based motorcycle engines with fuel injectors. U.S. Pat. No. 6,955,081 and U.S. Pat. No. 6,804,997 disclose two engine control apparatuses for determining crankshaft position, engine phase, engine loading, and intake air mass of an internal combustion engine through monitoring intake air pressure fluctuations. The techniques employed in these engine control apparatuses, however, rely primarily on monitoring intake air pressure fluctuation during normal combustion cycles and does not have any facility to account for sudden changes such as abrupt engine acceleration and deceleration and engine start. During these sudden changes, the margin of error in the measurement of intake air pressure can be so significant that renders it unreliable for determining crankshaft position, engine phase, engine loading, and in turn engine ignition timing. Therefore, without a failure redundancy mechanism that does not require substantial modification or addition such as additional sensors or multi-tooth crankshaft angular position sensor, to a basic internal combustion engine, neither the '081 patent nor the '997 patent presents a simple and low cost approach to retrofit carburetor-based motorcycle engines with fuel injectors. U.S. Pat. No. 4,893,244 discloses a microprocessor based electronic spark control for an internal combustion engine. The spark control determines engine ignition spark time using a prediction of engine speed. This prediction model, however, is designed based on multi-tooth crankshaft angular position sensing that can generate numerous pickup signals for each combustion cycle. As mentioned earlier, while multi-tooth crankshafts are commonly found in multi-cylinder car engines, it is unusual for multi-tooth crankshafts to be used in motorcycle engines, especially those below 500cc. Therefore, the '244 patent does not present a solution for retrofitting carburetor-based motorcycle engines with fuel injectors either.

SUMMARY

It is an objective of the presently claimed invention to provide a system and method for replacing, in a simple and inexpensive manner, the use of carburetor with the use of fuel injector in a traditional carburetor-based motorcycle engine. It is a further objective of the presently claimed invention to provide such system and method to enable the use of traditional single notch crankshaft and crankshaft position sensor for timing the fuel injection and ignition systems.

In accordance to one embodiment, the presently claimed invention includes a prediction mechanism for more accurate ignition timing and faster ignition synchronization by computing a predicted crankshaft angular velocity based on prior computed and verified crankshaft angular velocity and acceleration and determining a capture window of the next crankshaft position sensor pickup signal for the verification of the predicted crankshaft angular velocity.

In accordance to one embodiment, the presently claimed invention includes a manifold pressure sensor and a pressure monitoring process for monitoring the air pressure in the intake manifold for determining the stroke of the combustion cycle in turn providing more accurately timed signals for the fuel injection and ignition systems.

In accordance to one aspect of the presently claimed invention, ignition synchronization can be done even when it fails to correctly measure the air pressure in the intake manifold, which can be more likely to occur during engine start. This aspect is to perform a series of continuous spark-triggering. In the series of spark-triggering, each spark-triggering has a probability of being at the correct or incorrect point in the combustion cycle. If the spark-triggering lands on a correct point in the combustion cycle, the engine accelerates and the corresponding crankshaft rotational speed change can be detected by the crankshaft position sensor. On the other hand, if the spark-triggering lands on an incorrect point in the combustion cycle, the engine tends to remain at the same speed. This way, the correct point for the next spark triggering can be predicted and the generation of the signal for the next spark-triggering can be adjusted accordingly.

BRIEF DESCRIPTION OF THE DRAWINGS

Embodiments of the invention are described in more detail hereinafter with reference to the drawings, in which.

DETAILED DESCRIPTION

In the following description, embodiments of system and method to enable the use of traditional single notch crankshaft and crankshaft position sensor with fuel injection system are set forth as preferred examples. It will be apparent to those skilled in the art that modifications, including additions and/or substitutions may be made without departing from the scope and spirit of the invention. Specific details may be omitted so as not to obscure the invention; however, the disclosure is written to enable one skilled in the art to practice the teachings herein without undue experimentation.

Figure 1:
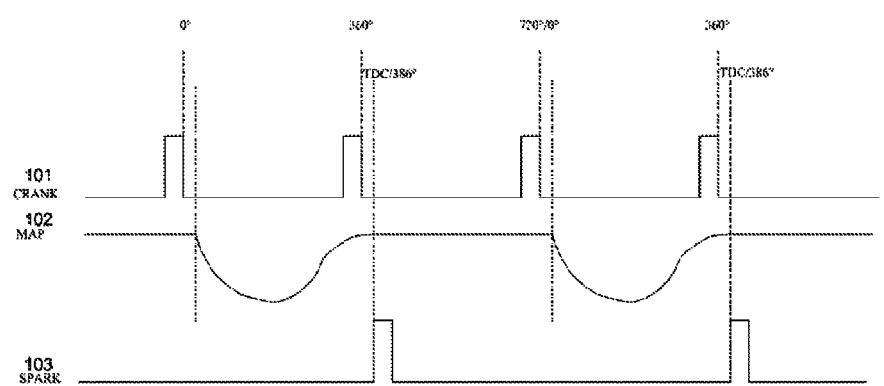
FIG. 1 shows a time-magnitude chart of crankshaft position sensor pickup signals, intake manifold air pressure measurements, and correctly timed spark triggering signals over a period of combustion cycle.

Referring to FIG. 1. FIG. 1 shows a time-magnitude chart of crankshaft position sensor pickup signals (101), intake manifold air pressure measurements (102), and correctly timed spark-triggering signals (103) over a period of two complete combustion cycles. There are four ordered strokes in a complete combustion cycle of a four-stroke engine: intake, compression, combustion (or power), and exhaust. Since the entire fuel injection and ignition timing is to be synchronized with the combustion cycle, which in turn bears direct relationship with the crankshaft's rotational angle, the scheduling time horizon for the fuel injection and ignition timing can be expressed in crankshaft's rotational angles. In one complete combustion cycle, the crankshaft would have rotated 720° or two complete turns; at the same time, the crankshaft position sensor for a traditional single notch crankshaft would have generated two pickup signals, one at about 720° (or 0°) and the other at about 360°. However, the spark triggering should only occur before the piston reaches the top of the compression stroke. Because a crankshaft position sensor pickup signal is generated at either half of the complete combustion cycle, the correct point of spark triggering cannot be determined solely from the crankshaft position sensor pickup signals.

To synchronize the ignition with the combustion cycle, in accordance to one embodiment, the presently claimed invention monitors additionally the intake manifold air pressure and determines the present stroke of the combustion cycle from both the crankshaft position sensor pickup signals and intake manifold air pressure measurements. As can be seen in FIG. 1, the intake manifold air pressure begins to drop at the beginning of an intake stroke then returns to constant pressurized state starting from the end of the intake stroke through the compression stroke. The correct point of spark triggering can then be determined to be at or approximately after the crankshaft position sensor pickup signal that immediately follows the rising edge of the intake manifold air pressure measurement.

There is a small delay from the time of the igniting the fuel-air mixture to the time when the fuel-air mixture is completely burning and the pressure in the combustion chamber reaches its maximum. If the spark is triggered right when the piston reaches the top of the compression stroke, the piston will have already moved down part of the way into its power stroke before the combustion chamber has reached its highest pressure. Thus, to achieve better efficiency and maximum power, the spark should be triggered before the piston reaches the top of the compression stroke. The time to completely burn the fuel-air is roughly constant. But the speed of the pistons increases as the engine speed increases. This means that the faster the engine goes, the earlier the sparks have to be triggered. This is referred to as spark advance. Therefore, after the initial synchronization of the ignition with the combustion cycle shortly after the engine start, the ignition timing needs to account for the varying spark advance when the engine runs at varying speed.

In order to determine the amount of spark advance needed for each combustion cycle, the engine speed needs to be monitored. Since the engine speed bears a direct relationship to the crankshaft rotational (or angular) speed, two or more successive crankshaft position sensor pickup signals can be used in its computation. However, abrupt engine speed change can happen in between two instances of crankshaft position sensor pickup signals. Furthermore, external interference can cause false and missing signals. Thus, using only the immediate two prior crankshaft position sensor pickup signals to predict the next crankshaft position sensor pickup signal generation time and crankshaft angular velocity in the next combustion cycle is prone to serious miscalculation.

Figure 2:
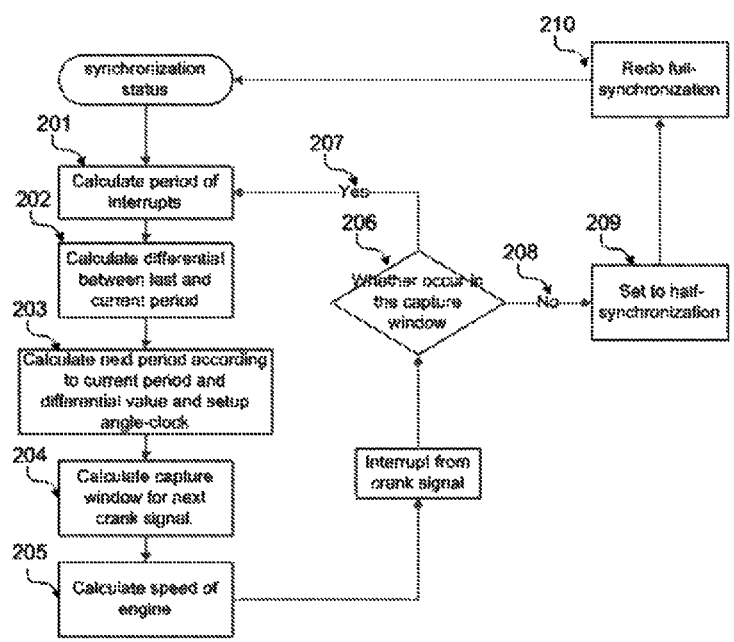
FIG. 2 shows a flow chart of the process of synchronizing the ignition with the combustion cycle in accordance to an embodiment of the presently claimed invention.

Referring to FIG. 2. In accordance to one embodiment, the presently claimed invention provides a method of crankshaft angular velocity prediction comprising the following steps:

1. (201) Compute the current period of interrupt, which is the current lapse time ($T_n$), which is the time lapsed since the last crankshaft position sensor pickup signal until the current crankshaft position sensor pickup signal.
2. (202) Compute the time during difference ($\Delta T$) between the last period of interrupt ($T_{n-1}$) and the current period of interrupt ($T_n$).
3. (203) Compute a predicted next period of interrupt ($T_{n+1}$) by:

$T_{n+1} = T_n + \Delta T * \alpha$, where $\alpha$ is a reasonable weighing factor.

4. (204) Compute the next capture window, which is the zone of likelihood of occurrence of the next crankshaft position sensor pickup signal ($W_{n+1}$) using the predicted next period of interrupt ($T_{n+1}$), wherein the capture window is a configurable period of time centered around an instance of time that is the predicted next period of interrupt ($T_{n+1}$) past the occurrence time of the current crankshaft position sensor pickup signal.
5. (205) Compute the current crankshaft angular velocity which is inversely proportional to the current period of interrupt ($T_n$).
6. (206) Determine whether the current crankshaft position sensor pickup signal occurred within the current capture window, which is the zone of likelihood of occurrence of the current crankshaft position sensor pickup signal ($W_n$).

7. (207) If within the current capture window ($W_n$), it means the current crankshaft angular velocity computed is reasonably accurate and that the current crankshaft position sensor pickup signal is reasonably reliable; repeat the process from step 1.
8. (208) If not within the current capture window ($W_n$), it means that the current crankshaft angular velocity computed is inaccurate and that the current crankshaft position sensor pickup signal is unreliable; and (209) the ignition timing is reset to the half-synchronization state, which is conditioned on having reasonable readings of crankshaft position sensor pickup signals but without the readings of intake manifold air pressure measurements for a fully synchronized ignition timing. (210) Once both crankshaft position sensor pickup signals and intake manifold air pressure measurements can be read properly, the ignition timing is re-synchronized using the aforementioned technique.

In accordance to one aspect of the presently claimed invention, ignition synchronization can be done even when it fails to correctly measure the air pressure in the intake manifold, which can be more likely to occur during engine start. This aspect is to perform a series of continuous successive spark-triggering, each following the crankshaft position sensor pickup signal. In the series of spark-triggering, each spark-triggering has a probability of being at the correct (during the compression-power stroke transition) or incorrect point (during the exhaust-intake stroke transition) in the combustion cycle. If the spark-triggering lands on the correct point in the combustion cycle, the engine accelerates and the corresponding crankshaft angular velocity change can be detected by the crankshaft position sensor. On the other hand, if the spark-triggering lands on an incorrect point in the combustion cycle, the engine tends to remain at the same speed. This way, the correct point for the next spark triggering can be predicted and the generation of the signal for the next spark-triggering can be adjusted accordingly. Basically, if the crankshaft rotation accelerates, then it means that the spark-triggering corresponding to the crankshaft position sensor pickup signal before the present or most recent one landed on a correct point in the combustion cycle; a spark is to be triggered again for the immediately next crankshaft position sensor pickup signal, and then every other crankshaft position sensor pickup signal.

The embodiments disclosed herein may be implemented using general purpose or specialized computing devices, computer processors, or electronic circuitries including but not limited to digital signal processors (DSP), application specific integrated circuits (ASIC), field programmable gate arrays (FPGA), and other programmable logic devices which can be generally referred to as engine control unit (ECU) configured or programmed according to the teachings of the present disclosure. Computer instructions or software codes running in the general purpose or specialized computing devices, computer processors, or programmable logic devices can readily be prepared by practitioners skilled in the software or electronic art based on the teachings of the present disclosure.

In some embodiments, the present invention includes computer storage media having computer instructions or software codes stored therein which can be used to program computers or microprocessors to perform any of the processes of the present invention. The storage media can include, but are not limited to, ROMs, RAMs, flash memory devices, or any type of media or devices suitable for storing instructions, codes, and/or data.

The foregoing description of the present invention has been provided for the purposes of illustration and description. It is not intended to be exhaustive or to limit the invention to the precise forms disclosed. Many modifications and variations will be apparent to the practitioner skilled in the art. Although the present invention has been described to be implementable in motorcycle engines, the present invention can be adapted to be implemented in other small engines, particularly those below 250 cc in size that are commonly used in scooters, lawnmowers, pumps, and industrial and farm machineries.

The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

What is claimed is:

1. An engine ignition control method for controlling timing of spark for initiating burning in a combustion chamber of a four stroke cycle internal combustion engine, said engine comprising a cylinder, a piston in said cylinder, a single notch crankshaft connected to said piston, said engine ignition control method comprising:

a crankshaft position sensor detecting the single notch crankshaft rotational movements and generating periodic pickup electrical signals as the single notch crankshaft rotates during a combustion cycle, wherein one crankshaft position sensor pickup electrical signal being generated for each full rotation of the single notch crankshaft;

an intake manifold air pressure sensor continuously measuring air pressure in an intake manifold in the engine;

a computer processor executing an ignition synchronization process comprising:

periodically receiving the crankshaft position sensor pickup electrical signals;

continuously receiving the intake manifold air pressure measurements;

predicting a next lapse time from a current crankshaft position sensor pickup electrical signal to a next crankshaft position sensor pickup electrical signal to verify crankshaft angular velocity for each full rotation of the single notch crankshaft, comprising:

computing a current lapse time, which is time lapsed since time of receipt of a last crankshaft position sensor pickup electrical signal until time of receipt of the current crankshaft position sensor pickup electrical signal, wherein the current crankshaft position sensor pickup electrical signal being the crankshaft position sensor pickup electrical signal most recently received by the computer processor, and the last crankshaft position sensor pickup electrical signal being the crankshaft position sensor pickup electrical signal received by the computer processor prior to the current crankshaft position sensor pickup electrical signal;

computing a difference in lapse time between a last lapse time and the current lapse time, wherein the last lapse time is time lapsed since time of receipt of one prior to the last crankshaft position sensor pickup electrical signal until time of receipt of the last crankshaft position sensor pickup electrical signal;

computing a predicted next lapse time, wherein the predicted next lapse time being the sum of the current lapse time and the difference in lapse time multiplied by a reasonable weighing factor;

computing a next capture window of the next crankshaft position sensor pickup electrical signal using the predicted next lapse time wherein the next capture window being a configurable period of time centered around an instance of time that is the predicted next lapse time past the time of receipt of the current crankshaft position sensor pickup electrical signal;

determining whether the current crankshaft position sensor pickup signal occurred within a current capture window of the current crankshaft position sensor pickup electrical signal;

if within the current capture window of the current crankshaft position sensor pickup electrical signal, then a current crankshaft angular velocity calculated from the current lapse time is verified; else if not within the current capture window of the current crankshaft position sensor pickup electrical signal, then the current crankshaft angular velocity is inaccurate and discarded;

determining correct points of spark triggering;

generating a spark-triggering electrical signal at each correct point of spark triggering;

wherein the determination of the correct points of spark triggering comprising:

if the current crankshaft angular velocity is verified, determining a spark advance based on the current crankshaft angular velocity; and setting each of the correct points of spark triggering at approximately after each of the received crankshaft position sensor pickup electrical signals that immediately follows each rising edge in the intake manifold air pressure measurements with an adjustment based on the spark advance determined.

2. The method of claim 1, further comprising:

executing an engine start initial ignition synchronization process during engine start time in which intake manifold air pressure measurement is unreliable, the engine start initial ignition synchronization process comprising:

initially generating a spark-triggering electrical signal for a first crankshaft position sensor pickup electrical signal;

computing the crankshaft angular velocity using time lapsed between the receipts of two crankshaft position sensor pickup electrical signals;

computing a crankshaft angular acceleration based on difference between the computed crankshaft angular velocity and a prior computed crankshaft angular velocity; and if the crankshaft angular acceleration is positive, then generating a spark-triggering electrical signal for next crankshaft position sensor pickup electrical signal; else if the crankshaft angular acceleration is negative, then generating a spark-triggering electrical signal for a crankshaft position sensor pickup electrical signal after next crankshaft position sensor pickup electrical signal.

* * * * *